United States Patent [19]

Ulveling

[11] Patent Number: 4,594,028
[45] Date of Patent: Jun. 10, 1986

[54] APPARATUS AND PROCESS FOR THE INJECTION OF METERED AMOUNTS OF PULVERIZED MATERIAL INTO A VESSEL

[75] Inventor: Léon Ulveling, Howald, Luxembourg

[73] Assignee: Paul Wurth S.A., Luxembourg

[21] Appl. No.: 431,678

[22] Filed: Sep. 30, 1982

[30] Foreign Application Priority Data

Oct. 2, 1981 [LU] Luxembourg .......................... 83671

[51] Int. Cl.⁴ .......................... B65G 53/66; F23D 1/00
[52] U.S. Cl. .............................. 406/30; 110/101 CF; 110/347
[58] Field of Search .............. 406/30, 197; 110/101 C, 110/101 CF, 101 CB, 104 R, 189, 347, 185

[56] References Cited

U.S. PATENT DOCUMENTS 4,231,686 11/1980 Sakamoto et al. .................... 406/30

FOREIGN PATENT DOCUMENTS 98408 8/1981 Japan ........................... 110/101 CF Primary Examiner—Jeffrey V. Nase
Assistant Examiner—L. E. Williams
Attorney, Agent, or Firm—Fishman & Dionne

[57] ABSTRACT

This invention presents apparatus and a process for the injection of metered amounts of pulverized materials by a pneumatic device into a vessel which is under variable pressure, and the application thereof to a shaft furnace.

10 Claims, 3 Drawing Figures

APPARATUS AND PROCESS FOR THE INJECTION OF METERED AMOUNTS OF PULVERIZED MATERIAL INTO A VESSEL

BACKGROUND OF THE INVENTION

This invention relates to apparatus and a process for the injection of metered amounts of pulverized material to a pressurized vessel. More particularly, this invention relates to apparatus and a process for the injection of metered amounts of pulverized material to a shaft furnace. The invention will be described in the embodiment of a blast furnace; but it is applicable to shaft furnaces in general and may be useful in any pressurized vessel which has a requirement for supply of pulverized material.

The apparatus and process of the present invention relates to the injection of metered amounts of pulverized materials by pneumatic means at a plurality of different points into a vessel which is under variable pressure. The pulverized material is injected through a plurality of pneumatic conveyance paths (pipes) supplied with a fluid comprised of the pulverized materials and the propellant (e.g., air). The propellant fluid is injected through a booster, while each of the pipes is provided with a variable delivery metering means for introducing metered amounts of pulverized materials into the fluid stream in each of the pipes.

The invention concerns more particularly, but is not limited to apparatus and a process for the injection of powdered coal into a blast furnace. The basic problem of the injection of solid fuels into a blast furnace has been solved by the process and the installation proposed in European Patent Application published under No. 21,222. The use of solid fuels, e.g., powdered coal or lignite, in blast furnaces, as a replacement for petroleum products, is of increasing interest in view of the fact that petroleum products are becoming increasingly expensive and increasingly scarce.

However, the use of pneumatic means for the injection of solid fuels into a blast furnace makes it necessary to control a certain number of variable, interrelated parameters, while observing certain starting or basic operating conditions. One of the starting or basic operating conditions is the injection of a predetermined amount by weight of fuels per unit of time into the blast furnace, for example, so many kilograms per hour, while ensuring regular distribution of this amount over the number of tuyeres through which the fuel is injected.

One of the main problems for successful coal injection is control of loss of pressure in the pneumatic conveyance paths. In order to effect pneumatic injection of pulverized coal, it is necessary to have pneumatic carriers, for example, pressurized air (which may be the mixing blast air as proposed in the European Patent published under No. 22,549), which not only effects delivery at a sufficient speed to avoid deposits or buildup of the coal in the conveying pipes and prevent backfiring, but in addition is at a sufficient pressure to overcome pressure losses in the conveying pipes and inject the fuel into the furnace against the action of the pressure prevailing in the furnace. Although the required speed for the pulverized coal can be determined by experimentation or by calculation, the same is not true of the pressure. Firstly, the pressure in the furnace is not constant; it undergoes fluctuations which in absolute value may be as high as one bar or more, and it is indispensable to take these fluctuations into account in order to effect the injection of solid fuels into the furnace against the action of that pressure and of these fluctuations. Secondly, the losses of pressure in the pneumatic conveying pipes are variable not only depending on the pressure in the furnace and the fluctuations of that pressure, but also depending on the length of these pipes, which obviously vary in length depending on which tuyere is connected to a given pipe. Considering that it is preferable to provide a separate conveying pipe for each tuyere and that the number of tuyeres in a blast furnace is about twenty, it will be apparent to and recognized by those skilled in the art that the problem posed in the control of the loss of pressure in the pipes and the correct metering of the solid fuel to be injected into the furnace is a problem of considerable and complex magnitude.

The aim of the present invention is to provide apparatus and an injection process which will achieve a solution to this complex problem.

In order to achieve this aim, the process of the present invention is characterized by (a) before the injection there is determined in each of the pipes a pressure measurement point situated in a position such that the loss of pressure $\Delta P$ between that point and the point of injection of the pulverized material into the vessel will be the same for all the pipes and for the same charge of material in the pneumatic stream, (b) the values of these losses of pressure between these two points in each pipe are determined by theoretical or experimental methods for a selected amount of pulverized materials and for different pressures inside the vessels; (c) these values (i.e., pressure losses) are stored in a memory in the form of calibration data or curves; (d) during the injection of pulverized coal the losses of pressure between the previously determined points are continuously monitored for each of the pipes; (e) the operation of the metering means is controlled, on the basis of the calibration curves, in such a manner that when fluctuations of pressure occur in the vessel the variations of losses of pressure caused by these fluctuations between the predetermined points are compensated by an increase or decrease of the charge of materials introduced by the metering means; and (f) that finally these losses of pressure between these determined points are maintained at a constant value corresponding to that determined by the total amount of material which it is desired to inject.

In other words, the loss of pressure, which previously was the core of the problem, is not only mastered but profitably utilized to control the metering means and regulate the pressure of the pneumatic fluid in accordance with the fluctuations of pressure in the vessel.

The necessary pressure of the pneumatic conveying fluid is provided by a booster (pump) associated with automatic flow regulators. The latter regulate the flow of the pneumatic fluid independently of its pressure, that is to say the pneumatic fluid passes through this regulator at the pressure necessary to entrain the pulverized material into the vessel against the action of the pressure prevailing in the vessel. Thus, according to the present invention, the pressure of the pneumatic fluid is automatically adapted to the amount of pulverized material delivered by the metering means into the pneumatic pipe, so that the loss of pressure between the desired measurement point in the pipe concerned and the point of injection into the vessel is maintained at a set value supplied by the calibration curves.

As a preferred embodiment, the process of the invention is used for the injection of powdered coal or lignite into a blast furnace. The features, characteristics and advantages of the invention will be described in detail with reference to one application to the preferred embodiment of a blast furnace, indicated below by way of example without constituting a limitation.

BRIEF DESCRIPTION OF THE DRAWINGS

Referring to the drawings.

DESCRIPTION OF THE PREFERRED EMBODIMENT

The invention will be described, by way of illustration, with reference to its application in an installation such as that proposed in the two above-mentioned European Patent Applications. In this application the propellant fluid will be cold air, such as is normally used for the stabilization of the temperature of the hot blast air of a blast furnace, while the pulverized material is powdered coal. The vessel under pressure will be a blast furnace. It is, however, obvious that the invention is also applicable to other propellant fluids, to other pulverized materials, and to other shaft furnaces or vessels under pressure.

Figure 1:
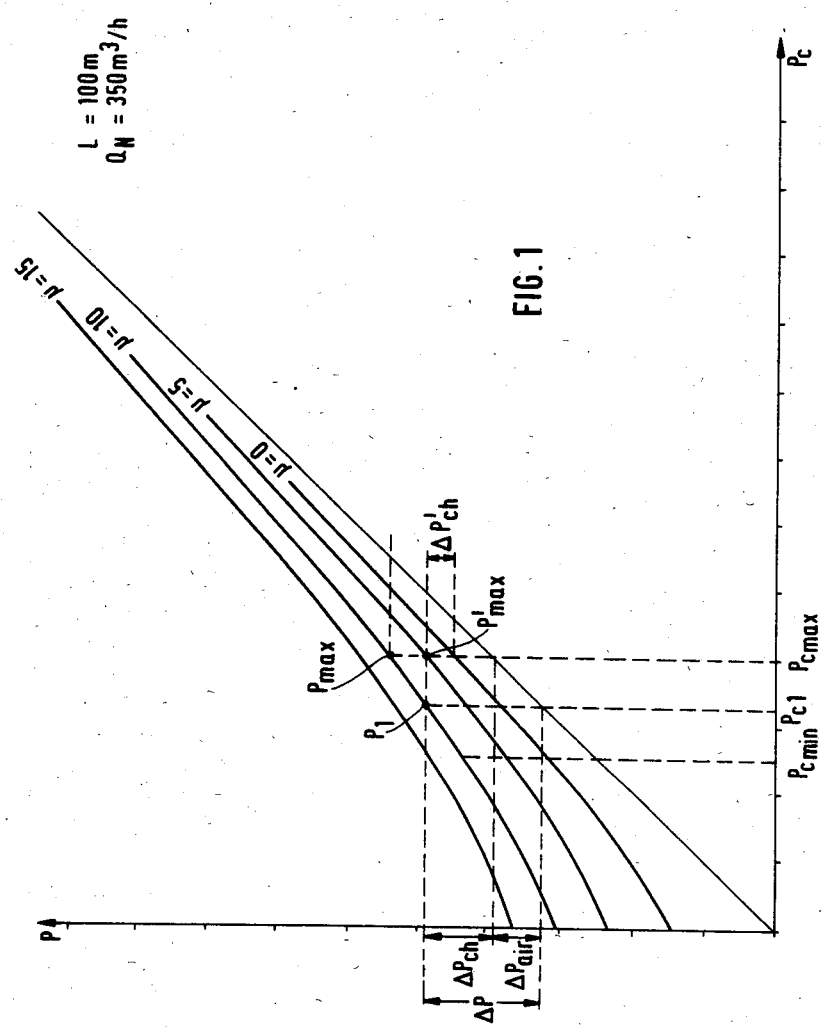
FIG. 1 shows a family of characteristic curves of the pneumatic injection of a solid fuel into a blast furnace.

FIG. 1 shows a series of curves indicating the minimum pressure necessary upstream of the metering means for the injection of the propellant fluid charged with powdered coal into a blast furnace, in which prevails a back pressure "$P_c$" (this blast furnace pressure "$P_c$" being plotted on the abscissa in the diagram). These curves have been calculated for a conveying pipe of a length of one hundred meters and for an amount of propellant air of three hundred and fifty cubic meters per hour.

The straight line at an angle of 45° represents the theoretical static conditions corresponding to equilibrium, i.e., the situations under which there is no flow in the pneumatic conveying path into the furnace, in view of the fact that the pressure P of the propellant fluid is equal to the back pressure $P_c$ of the blast furnace. The parameter of the various curves is the density u representing the number of kilograms of powdered coal per kilogram of propellant air per hour. The bottom curve, for which $\mu$ is equal to zero, corresponds to the injection of pure air, while in proportion as the coal density increases the curves rise on the ordinate. The curve corresponding to $\mu = 10$ represents the injection of 3,500 kilograms of powdered coal per hour.

The loss of pressure in the pneumatic conveying path, i.e., the difference in pressure between the metering means (which may be a cellular rotor type air lock) and the point of injection into the furnace, corresponds to the ordinate difference between a determined point on one of the curves and the corresponding point on the stated equilibrium straight line at an angle of 45° having the same abscissa. In FIG. 1 this loss of pressure has been represented by $\Delta P$ for a pressure "$P_c$" the furnace and for a density of the pneumatic fluid of u=10. This loss of pressure $\Delta P$ is composed of a loss of pressure represented by $\Delta P_{air}$ corresponding to the loss of pressure of the propellant air and a loss of pressure $\Delta P_{ch}$ corresponding to the loss of pressure due to the powdered coal. In view of the fact that the curves of FIG. 1 are not parallel, these differences in pressure or losses of pressure $\Delta P$ vary not only from one curve to another, but also in dependence on the absolute instantaneous value of the pressure $P_c$ inside the furnace. However, since these curves exponentially approach a straight line at an angle of 45° for high back pressures, these variations are relatively slight within the range of normal variations of the back pressure inside a blast furnace, this range being limited by the minimum pressure represented by $P_{c\text{-}min}$ and the maximum pressure represented by $P_{c\text{-}max}$ in FIG. 1.

It should be noted that the curves in FIG. 1 represent optimum pressure curves, that is to say curves with a minimum pressure which is sufficient to ensure a minimum speed of fluid flow in the pneumatic conveying path, so as to ensure that there is no risk of the formation of a blockage and that there is no propogation of the combustion in the opposite direction to the flow of the pneumatic current. It is clearly to be understood that a pressure P higher than that shown in the diagram for each of the values of u would comply with the conditions necessary for injection, but would not be advantageous from the point of view of economy, since it would be necessary to operate the booster at a higher than sufficient rate, thus giving rise to waste of energy.

In order to ensure that the injection of the powdered coal will be effected under optimum conditions in a shaft furnace such as a blast furnace, the injection must be effected in accordance with the diagram shown in FIG. 1. That means that for a determined charge of powdered coal, such as with $\mu = 10$, the pressure of the propellant air must be varied in accordance with the curve characterized by the parameter $\mu = 10$ when fluctuations of $P_c$ occur. Mathematically, the pressure of the propellant fluid can be expressed by the following formula:

$$P_i = P_c + \Sigma \Delta P_i,$$

where "i" represents a particular pipe or pneumatic conveyance (which may for example vary between 1 and 20 if there are twenty tuyeres), "$P_i$" equals the pressure just upstream of the coal metering means in the pneumatic pipe "i", and "$\Sigma \Delta P_i$" represents the total of all the losses of pressure in the pipe "i".

In view of the fact that the back pressure $P_c$ in the blast furnace is known from continuous measurements for other purposes, it would be possible to determine the necessary pressure P if the total pressure losses were known. It is however precisely this which entails the problem, since the losses of pressure $\Delta P$ are dependent on the back pressure $P_c$, and on the charge or density $\mu$ of the powdered coal. In addition, the losses of pressure $\Delta P$ are variable from one pipe to another because these pipes necessarily have different lengths caused by the positions of the tuyeres, and the losses of pressure are inherently greater in the longer pipes.

Figure 2:
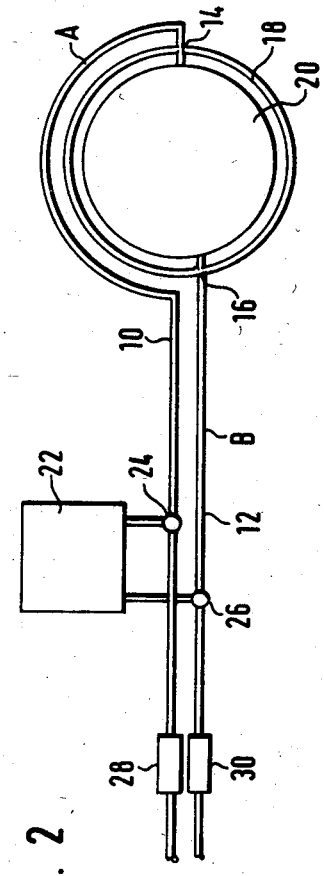
FIG. 2 shows schematically two pneumatic lines serving two tuyeres at opposite points on a blast furnace.

FIG. 2 shows schematically two pipes 10 and 12 respectively supplying the tuyeres 14 and 16, which are, in turn fed by a circular hot blast air pipe 18 for injecting hot blast air into the shaft furnace 20. A pulverized coal distribution tank 22 is connected to metering means 24 and 26 incorporated in the pipes 10 and 12. The powdered coal is introduced into the current of compressed air in pipes 10 and 12 from tank 22 through metering means 24 and 26 to form the pneumatic fluid or current. The flow of compressed air is regulated by automatic flow regulators 28 and 30. The metering means, the number of which is equal to the number of pipes and to the number of tuyeres, may consist of cellular rotor air locks or quite simply of metering valves, known in the art, which are incorporated in the discharge pipes of the distribution tank 22. Because of the arrangement of the tuyeres around the furnace 20, all the pipes are necessarily of different lengths and in the case of FIG. 2 the pipe 10 is obviously longer than the pipe 12, so that the losses of pressure are higher in that pipe 10 than in the pipe 12.

The present invention operates to control the losses of pressure in the various pipes by keeping the losses constant in each of the pipes "i". However, in order to be able to keep the losses constant in each pipe, the losses must be monitored; and in order to monitor them, these pressures in the pipes must be measured. Moreover, in order to have significant measurements of $\Delta P$, and for these measurements to be comparable among the different pipes, the measurements must be made at clearly determined points in each pipe.

In view of the fact that differences of pressure are measured, two pressure values must be known at two different points for each of the pipes. One of these points will be the point of injection into the tuyeres. Since the pressure at that point is equal to the back pressure $P_c$ of the blast furnace, and since this pressure is known and is equal for all the pipes "i", it will not be necessary to make an independent measurement of $P_c$ for each pipe. The second measurement point for each of the pipes will be situated, in each of the pipes, at an upstream location such that the loss of pressure $\Delta P$ between that point and the point at which coal is injected into the blast furnace will be the same for all the pipes and for the same charge (i.e., density $\mu$) of material in the pneumatic current. For the pipes 10 and 12 these two measurement points have been represented by the points A and B.

The measurement points A and B are determined by a combination of theoretical approximation and by experiment. The locations of the points A and B are first calculated approximately, using for this purpose known mathematical formulae and taking into account the shape of the pipes. For example, because of the curvature, the loss of pressure in the pipe 10 will be greater than that in the pipe 12. After these measurement points have been approximately calculated in this manner, experimentation is effected by shifting the actual measurement points along the two pipes until the actual points are located where the losses of pressure from those points to the point of injection into the blast furnace are equal for each of the pipes. Consequently, in the example illustrated, the loss of pressure between point A and the tuyere 14 must be equal to the loss of pressure between point B and the tuyere 16 for the same amount of pulverized coal, i.e., for a selected density $\mu$ of the fluid stream in both pipes.

As noted previously, in each of the pipes the loss of pressure is dependent on the density $\mu$ of powdered coal conveyed in the pneumatic current. The present invention proposes to make use of this relationship to compensate for variations of the losses of pressure resulting from fluctuations of the back pressure in the blast furnace, by suitable regulation of the operation of the metering means, to increase or decrease the amount of powdered coal delivered (i.e., vary $\mu$) in order to maintain the loss of pressure in the pipes at a constant value.

This control may be effected with the aid of a microprocessor, in which the curves of FIG. 1 have been stored in memory. Accordingly, the value of the loss of pressure for a determined back pressure and for a determined density is known. for example it is known that for a back pressure of $P_{cl}$ and a density of $\mu=10$, the loss of pressure of the powdered coal is equal to $\Delta P_{ch}$, as shown in FIG. 1. Consequently, if injection is effected with these parameters, the pressure of the propellant air must automatically assume the value $P_1$ just upstream of the metering means.

If it is now assumed that the back pressure in the blast furnace increases, for example, from $P_{cl}$ to $P_{c\text{-}max}$ with the same pressure $P_1$ of the compressed air at the metering means, the point represented by $P'_{max}$ in the curves shown in FIG. 1 would be reached. With the passage from $P_1$ to $P'_{max}$, the loss of pressure of the powdered coal falls from $\Delta P_{ch}$ to $\Delta P'_{ch}$, as shown in FIG. 1, while the density passes from $\mu=10$ to $\mu=5$.

If, starting from the point $P'_{max}$, the density u is increased, the loss of pressure $\Delta P'_{ch}$ is also increased. Consequently, if the density $\mu$ is increased until the loss of presure is once again equal to $\Delta P_{ch}$, the flow must be increased until the curve $\mu=10$ is reached again. The pressure of the compressed air at the metering means must be adapted to this increase and consequently automatically passes to the point $P_{max}$. It is obvious that by continuously automatically regulating the rhythm of the metering means so that the loss of pressure remains constant and equal to $\Delta P'_{ch}$, the point $P'_{max}$, is not passed through in order to pass from $P_1$ to $P'_{max}$, but this passage is made by directly following the curve corresponding to $\mu=10$.

If working is confined to the practically linear range of the curves shown in FIG. 1, which has been assumed in the reasoning above, it is sufficient to store in memory the value of $\Delta P_{ch}$ for each of the pipes because, as can be seen in FIG. 1, this value remains practically constant between $P_{c\text{-}min}$ and $P_{c\text{-}max}$. The slight theorectical variation of $\Delta P_{ch}$ due to the convergence of the curves shown in FIG. 1 is in fact translated in reality into a density $\mu$ slightly higher or lower than that shown by the curves. However, for high back pressure this deviation is insignificant for the operation of the furnace. It is nevertheless possible also to take this fact into account, particularly for low back pressures with which it is necessary to operate within a truly non-linear range, by memorizing a plurality of values of $\Delta P_{ch}$ for each of the pipes, the number of these values obviously being dependent on the desired accuracy.

Figure 3:
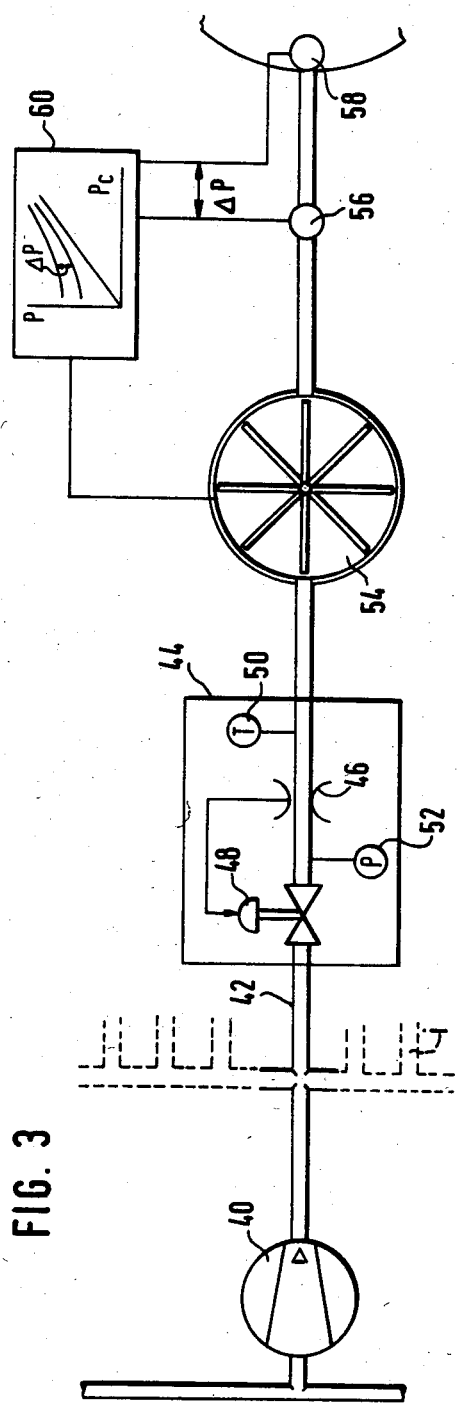
FIG. 3 shows a flow diagram illustrating the process of the invention.

FIG. 3 shows a flow diagram illustrating the operating process. A booster 40 feeds each of the pipes "i" with compressed air. In each of the pipes "i" a monitoring and control unit is provided, this unit being similar to that represented as a whole by the unit 44 in the pipe 42. This unit is in fact an automatic flow regulator, well known in the art and available on the market. This unit 44 comprises essentially a measuring diagram 46 which measures the effective flow of the compressed air and automatically controls a valve 48 to allow the passage of only the necessary amount of compressed air. The control unit 44 also has a temperature control means 50 and a pressure measurement means 52 to monitor air pressure and termination.

A metering means unit 54 delivers the powdered coal into the pipe 42. Through the action of the automatic flow regulator 44, the pressure in the pipe 42 just upstream of the metering means 54 is automatically adapted to the value required to entrain the powder delivered by the metering means 54.

Unit 56 designates a pressure measurement sensor located at a point determined as explained for points A and B as with the explanations given in connection with FIG. 2. Unit 58 designates a pressure measurement sensor for the measurement of the back pressure $P_c$ in the blast furnace. The measurements of the sensors 56 and 58 are transmitted to a microprocessor 60 in which the set values of $\Delta P$ have been memorized and which calculates the actual value of $\Delta P$ on the basis of the measurements made at sensor 56 and 58. The microprocessor 60 compares the set value with the actual value of $\Delta P$ and controls the metering means 54 in such a manner that the loss of pressure $\Delta P$ remains constantly equal to the memorized set value.

While preferred embodiments have been shown and described, various modifications and substitutions may be made thereto without departing from the spirit and scope of the invention. accordingly, it is to be understood that the present invention has been described by way of illustrations and not limitation.

What is claimed is:

1. A process for the injection of metered amounts of pulverized materials by pneumatic means at a plurality of different points into a vessel which is under variable pressure, through a plurality of pneumatic conveyance paths supplied with pulverized materials in a stream of pressurized propellant fluid, comprising the steps of:
   (a) determining for each of said conveyance paths a first point at which the pressure loss between the first point and the point of injection of the pulverized material into the vessel is equal for all conveyance paths for a selected density of the pulverized material in the fluid stream;
   (b) determining the losses of pressure between each first point and the point of injection for a plurality of pressure levels within the vessel;
   (c) monitoring the pressure losses between each first point and the point of injection for each conveyance path during operation of the vessel;
   (d) varying the amount of pulverized material in the fluid stream in accordance with changes in pressure in the vessel; and
   (e) maintaining in each conveyance path a constant pressure loss between the first point and the point of injection in accordance with the amount of pulverized material to be injected into the vessel.

2. The process of claim 1 further including:
storing the data of pressure losses as calibration data in a memory.

3. The process of claim 1 further including:
storing the data of pressure losses as calibration data in a microprocessor.

4. The process of claim 1 wherein:
the determined pressure losses are determined theoretically and by experiment.

5. The process of claim 1 wherein:
the loss of pressure between the first point and the point of injection for each conveyance path is determined for a plurality of selected densities of pulverized material in the fluid stream.

6. The process of claim 1 wherein:
the vessel is a blast furnace and the pulverized material is a fuel.

7. Apparatus for the injection of metered amounts of pulverized materials by pneumatic means at a plurality of different points into a vessel which is under variable pressure, through a plurality of pneumatic conveyance paths supplied with pulverized materials in a stream of pressurized propellant fluid, comprising:
   (a) means for determining for each of said conveyance paths the pressure at a first point and the point of injection of the pulverized material into the vessel;
   (b) means for monitoring the pressure losses between each first point and the point of injection for each conveyance path during operation of the vessel;
   (c) means for varying the amount of pulverized material delivered to the fluid stream in accordance with changes in pressure in the vessel; and
   (d) means for maintaining in each conveyance path a constant pressure loss between the first point and the point of injection in accordance with the amount of pulverized material to be injected into the vessel.

8. The apparatus of claim 7 further including:
means for storing data of pressure losses as calibration data in a memory for a plurality of pressures in the vessel and a plurality of densities of pulverized material in the stream.

9. The apparatus of claim 8 wherein:
said storing means is a microprocessor.

10. The apparatus of claim 7 wherein:
the vessel is a blast furnace and the pulverized material is a fuel.

* * * * *